(12) United States Patent
Green

(10) Patent No.: US 7,480,443 B2
(45) Date of Patent: Jan. 20, 2009

(54) DATA PROCESSING SYSTEM AND METHOD

(75) Inventor: Stuart A. Green, Sheffield (GB)

(73) Assignee: Zootech Limited (GB)

( * ) Notice: Subject to any disclaimer, the term of this patent is extended or adjusted under 35 U.S.C. 154(b) by 756 days.

(21) Appl. No.: 10/757,631

(22) Filed: Jan. 14, 2004

(65) Prior Publication Data

US 2005/0094982 A1 May 5, 2005

(30) Foreign Application Priority Data

Nov. 5, 2003 (GB) ............................ 0325823.3

(51) Int. Cl.
*H04N 5/91* (2006.01)
(52) U.S. Cl. .................... 386/95; 386/69; 386/105; 386/46; 386/124; 386/125
(58) Field of Classification Search ........... 386/69, 386/95, 105, 46, 124–125
See application file for complete search history.

(56) References Cited

U.S. PATENT DOCUMENTS 5,568,454 A 10/1996 Shima et al. ............... 369/13
6,266,483 B1* 7/2001 Okada et al. .............. 386/128
2003/0083850 A1 5/2003 Schmidt et al. ............ 702/189
2004/0047603 A1* 3/2004 Tanaka et al. ............... 386/95

FOREIGN PATENT DOCUMENTS

| EP | 0083686 | 7/1983 |
|---|---|---|
| EP | 0564916 | 10/1993 |
| GB | 2303269 | 12/1997 |

OTHER PUBLICATIONS

Slattery, O. (2003) "Information Technology: DVD-ROM Drive Compatibility Test", NIST Special Publication 500-254: National Institute of Standards and Technology.

* cited by examiner

*Primary Examiner*—Thai Tran
*Assistant Examiner*—Helen Shibru
(74) *Attorney, Agent, or Firm*—Wilmer Cutler Pickering Hale & Dorr LLP.

(57) ABSTRACT

Embodiments of the present invention relate to a data processing system and method for automatically testing, for example, a DVD to ensure compliance with an intended mode of operation. Tags or unique identifiers are embedded within the MPEG elementary video streams. These tags are detected and correlated against a test plan to determine whether or not the authored DVD is as intended.

14 Claims, 3 Drawing Sheets

DATA PROCESSING SYSTEM AND METHOD

FIELD OF THE INVENTION

The present invention relates to a data processing system and method and, more particularly, to automated testing of digital content and media comprising such content.

BACKGROUND TO THE INVENTION

There are typically three types of testing that are undertaking to test DVD products. These three types of testing aim to test (1) functionality, (2) quality and (3) compatibility. The functionality testing of a DVD product aims to confirm that the navigation paths through the various menus and, ultimately, to the various digital content, is as intended. This test is typically achieved by a person using the disc and performing a number of tests and checks dictated by, for example, a functionality test plan. The functionality test plan comprises a list of features or actions that a user of a disc under test should be able to perform. The test plan investigates whether or not various tests have been met and whether or not the response to various actions were as anticipated. The functionality test plan might be used in conjunction with a flowchart that shows the navigation paths through the menus and various audiovisual assets stored on the test disc.

It will be appreciated that this is a labour intensive and time-consuming process. As the navigation complexity of the content of a DVD increases and as the number of assets used by the navigation structure or navigation process increases, it becomes impractical to test every possible navigation path. Therefore, a tester usually concentrates on a statistically significant subset of all possible navigation paths of the disc in determining whether or not the disc meets the test plan. However, using a small sample or test space to decide whether or not a disc operates as intended is risky in that errors might still exist in some untested portions of the content.

It is an object of embodiments of the present invention at least to mitigate some of the problems of the prior art.

SUMMARY OF INVENTION

Accordingly, a first aspect of embodiments of the present invention provides a data processing system comprising a controller for processing a data stream comprising data representing at least one of a first video sequence (digitised video data) having associated identification data (unique identifier embedded in the user_data field) and associated navigation data; means (identifier extractor) to identify the associated identification data; a correlator (Navigation enumerator and identifier index) to correlate the identification data with a template (test plan) comprising data representing an abstraction of the first video sequence and the navigation data to determine whether or not there is a predetermined correlation, expressed in the template, between the data stream, or first video sequence, and the data contained within the template.

Advantageously, embodiments of the present invention allow at least the functionality of, for example, a DVD or DVD-video image data to be tested. It will be appreciated that this might allow significant savings to be made both in terms of time spent testing and labour charges associated with that testing. Furthermore, it also carries the additional possible benefit of DVD's being tested more thoroughly, which should, in turn, ensure that the user's experience of that DVD is not impaired by any errors.

BRIEF DESCRIPTION OF THE DRAWINGS

Embodiments of the present invention will now be described, by way of example only, with reference to the accompanying drawings in which.

DETAILED DESCRIPTION OF PREFERRED EMBODIMENTS

Figure 1:
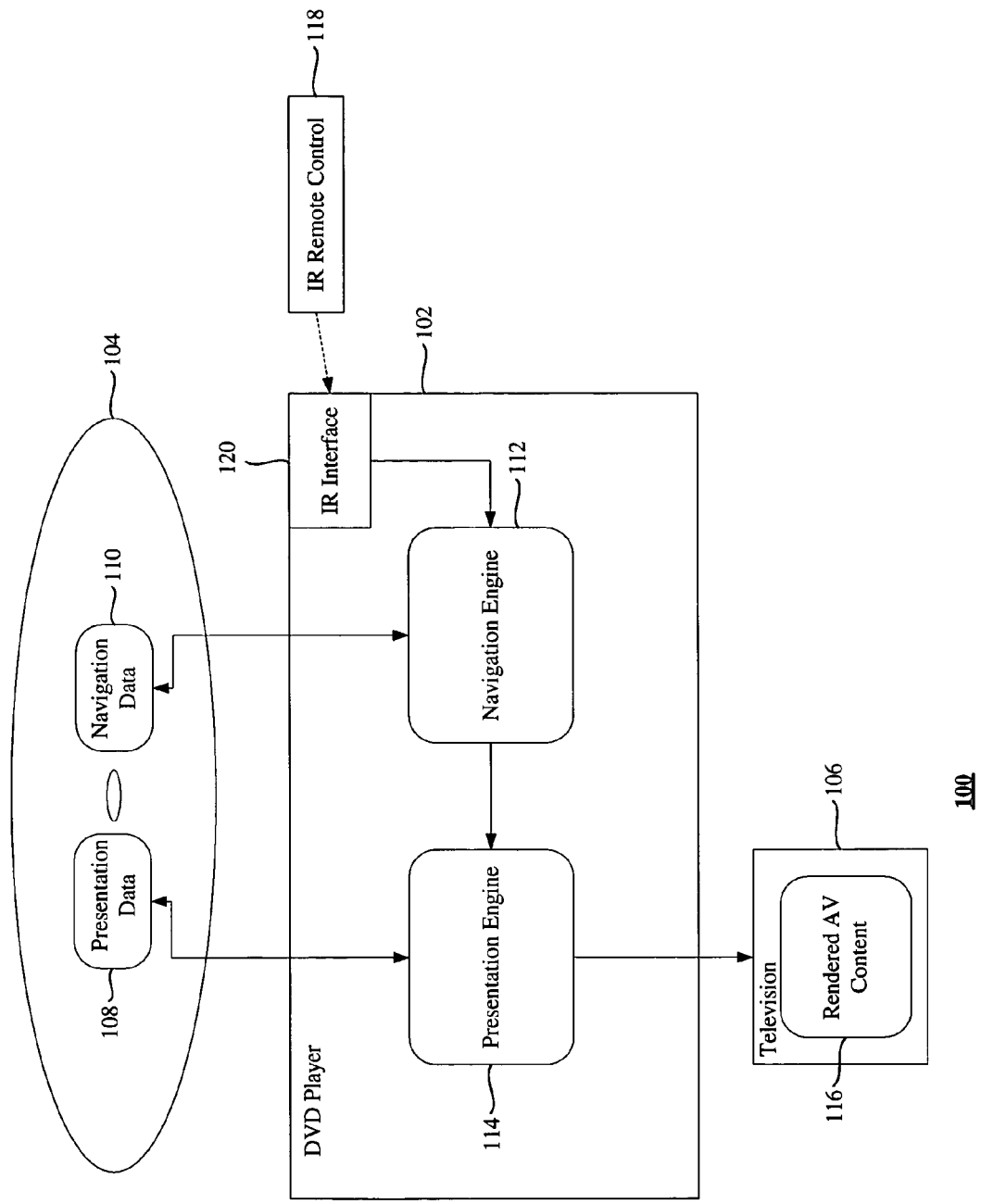
FIG. 1 shows, schematically, a typical home entertainment system comprising a DVD player, a DVD and a television.

FIG. 1 shows, schematically, a typical home entertainment system 100 comprising a DVD player 102, a DVD 104 and a television 106. The DVD 104 comprises presentation data 108 and navigation data 110. The navigation data 110 is used by a navigation engine 112 within the DVD player 102 to control the order or manner of presentation of the presentation data 108 by a presentation engine 114. The presentation engine 114 presents the presentation data 108 on the television 106 as rendered audiovisual content 116. As is well known within the art, the rendered audiovisual content 116, conventionally, takes the form of a movie or photographic stills or text associated with that movie. It will be appreciated that a navigation manager represents, or represents at least part of, an embodiment or a navigation engine or controller. Similarly, a presentation engine represents an embodiment of at least part of a presentation engine or controller.

The presentation data and navigation data, that is, the DVD-video disc image data, comprises audiovisual content that is derived from raw content objects, which include audio content and visual content, and structured according to a navigation plan that reflects desired transitions and relationships between the parts of the audiovisual content or the raw content objects used to produce the audiovisual content. Within an authoring tool, the raw content objects are represents by respective abstractions that are typically icons. It will be appreciated that, for example, such abstractions can be a "scenario" that is produced by the Scenarist product available from Sonic Solutions.

A user (not shown) can use a remote control 118 associated with the DVD player 102 to influence the operation of the navigation engine 112 via an infrared remote control interface 120. The combination of the infrared remote control 120 and the navigation engine 112 allows the user to make various selections from any menus presented by the presentation engine 114 under control of the navigation engine 112 as mentioned above.

Figure 2:
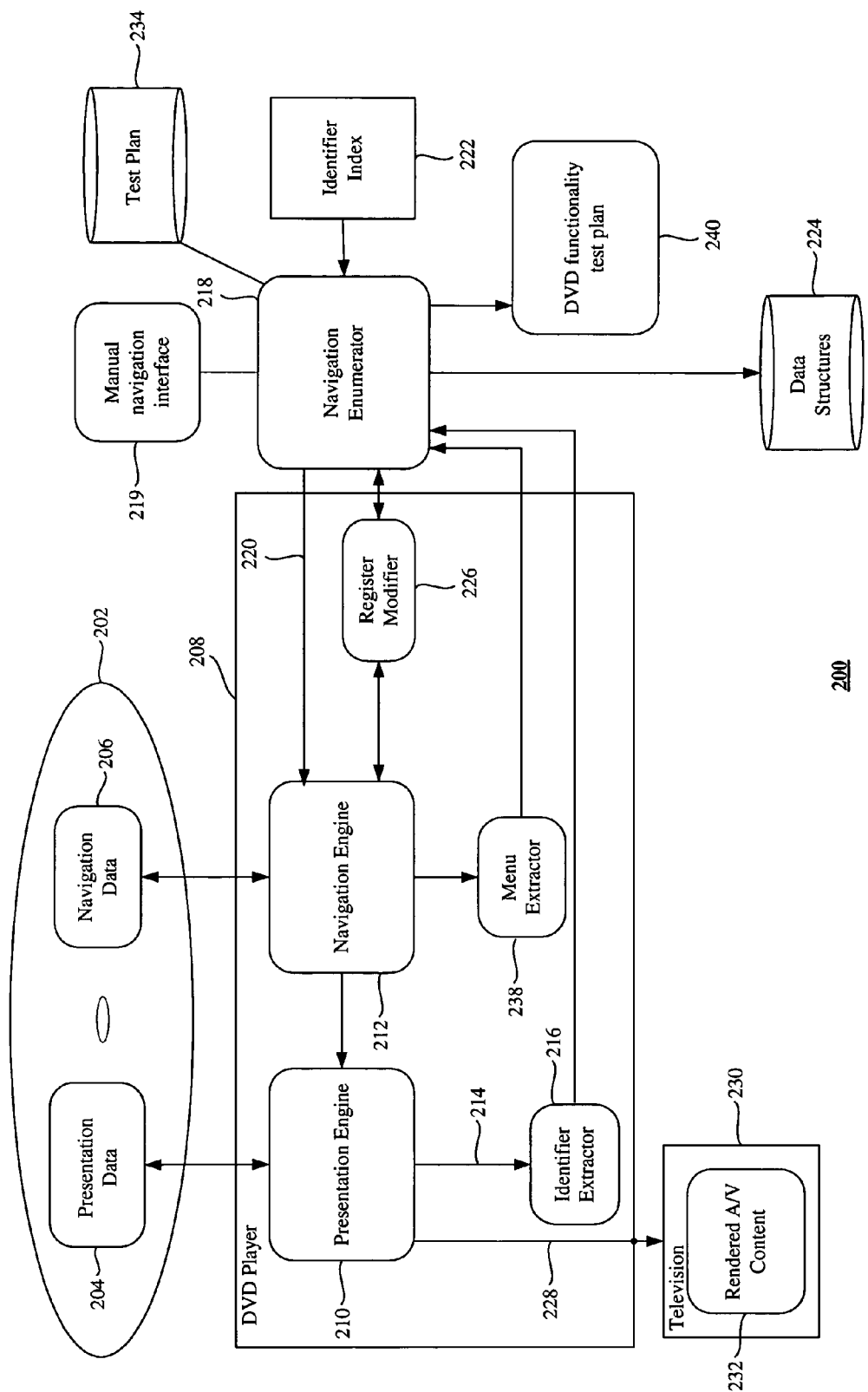
FIG. 2 illustrates a first embodiment at least part of the present invention.

Referring to FIG. 2, there is shown a testing arrangement 200 using an embodiment of the present invention. FIG. 2 shows a DVD disc 202 storing presentation data 204 and navigation data 206. The DVD player 208 comprises a respective presentation engine 210 and navigation engine 212. In preferred embodiments, the DVD player 208 is a software player, that is, it is executable by a computer such as, for example, a desk-top PC or other computer.

It will be appreciated that the presentation data 204 comprises a number of audiovisual assets (not shown). The video assets are encoded during the authoring process to have an associated unique identifier. Alternatively, only selected video assets might be encoded with such an associated unique identifier. For example, when encoding video data, that is, a video sequence, to produce a corresponding MPEG video stream, the unique identifier might be placed in the user_data field of the MPEG video stream as defined by the MPEG-2 standard, which is incorporated herein by reference for all purposes. The unique identifier allows the associated video asset to be identified. In a preferred embodiment, the presentation engine 210 processed the presentation data stream 214 using an identifier extractor 216. The identifier extractor 216 extracts the data representing the unique identifier from the user_data field of the MPEG elementary video stream 214 and forwards the unique identifier to a navigation enumerator 218.

In preferred embodiments, the unique identifiers are embedded within the MPEG streams during authoring. This has the advantage that an association can be created more readily between a unique identifier and the abstraction representing the raw content or raw content object from which the MPEG stream is derived. Alternatively, or additionally, prior to testing audiovisual content, the content can be traversed to assign unique identifiers to each, or selected, MPEG streams, which will allow the navigation through that content to be tracked using the unique identifiers.

The navigation enumerator 218, in effect, replaces the infrared remote control 118 mentioned above. The navigation enumerator 218 generates control signals that influence the operation of the navigation engine 212 in substantially the manner as the infrared signals influence the operation of the navigation engine 212. The navigation enumerator 218 is responsive to a functionality test plan 240. The functionality test plan 240 comprises a high level abstraction of the data anticipated to be contained on the disc. The test plan contains an expectation of the paths through the data contained on the disc together with a high-level abstraction of the elements anticipated as representing that data. In preferred embodiments, the test plan might comprise at least one of a start point, which can be defined in terms of initialisation data for initialising the DVD player's registers, for example, an indication of anticipated events or outputs expected to be produced by the player, unique identifiers associated with those events or outputs and commands that are intended to simulate menu selections or button commands, that is, user input actions. The navigation enumerator 218 comprises a copy of each identifier incorporated into the presentation data 204 together with respective references to high level abstractions of the assets associated with the unique identifiers. In preferred embodiments, the high level abstractions or data structures that correspond to the various assets forming the presentation data 204 are stored on an HDD 224. Upon receiving a unique identifier from the identifier extractor 216, the navigation enumerator 218 uses that identifier to obtain a reference to the high level abstraction corresponding to the unique identifier via the identifier index 222. The high level abstraction associated with the unique identifier is obtained, using the reference, from the high level abstractions or data structures stored on the HDD 244. The retrieved high level abstraction or data structures are compared with high level abstraction or data structures forming part of the test plan 240 to determine with there is a match or correlation between them according to a current position within the test plan. Alternatively, the extracted unique identifier is compared to an anticipated unique identifier to determine whether or not the content is being retrieved and processed as anticipated. The current position within the test plan is maintained or managed by the navigation enumerator. The current position within the test plan 240 corresponds to the next high-level data abstraction anticipated to match the next unique identifier, and, consequently, the next video sequence, retrieved from the presentation data stream 214. If there is a match or correlation between the two high-level abstractions, the navigation enumerator creates a record to that effect. If there is not a match or correlation between the two high-level data abstractions, the navigation enumerator creates a record to that effect. In preferred embodiments the record contains an indication of the unique identifier together with an indication of the high-level abstraction associated with that identifier and the high-level abstraction anticipated as being identified by the test plan. The records are stored in a respective file 234 created by the navigation enumerator. Alternatively, or additionally, the record might comprise visual information of what was expected and what was actually produced. For example, screen shots or video sequences of the actual output of the presentation engine might be stored within the record. Optionally, the anticipated screen shots or video sequences might also be stored within the record.

A register modifier 226, forming part of the DVD player 208, is used to read and/or modify the settings of the GPRMs and SPRMs of the DVD player 208. The register modifier 226 is operated under the control of the navigation enumerator 218 to cause the navigation engine to access and give effect to the navigation data 206 in a pre-determined manner or according to the requirements of the test plan 240. In effect, the register modifier 226 controls the traversal of the disc 202 or access to the assets stored on the disc 202 to allow each, or selected, navigation paths through the assets to be explored and associated audiovisual assets retrieved and rendered or processed to identify matches, or mismatches, between those assets with their anticipated high-level abstractions according to the test plan.

Preferably, the embodiments also comprise a menu extractor 238. The menu extractor is used to intercept or process presentation data that identifies a current menu being processed. It will be appreciated that the presentation data can comprise menu data within or associated with an MPEG stream and that such an MPEG stream can have an associated unique identifier. Therefore, a unique identifier can also be used to identify a corresponding menu within the current presentation data stream. Hereafter, a unique identifier associated with a menu will be referred to as menu identification data. In preferred embodiments, the identifier index 222 also contains a mapping between menu identification data and high-level abstraction data associated with such menu identification data. Again, the navigation enumerator 218 uses the data output by the menu extractor 238, in conjunction with the identifier index 222 and the high-level abstraction data forming part stored on the HDD 224, in a comparison with the test plan 240 to determine whether the authored DVD is as anticipated.

In preferred embodiments, the DVD player 202 comprises a manual navigation controller 219 that presents an interface to a user (not shown) that can be used to influence the operation of the DVD player 202. In preferred embodiments, the user interface of the manual navigation controller is used to create the tests plans and/or to select between previously created test plans.

Figure 3:
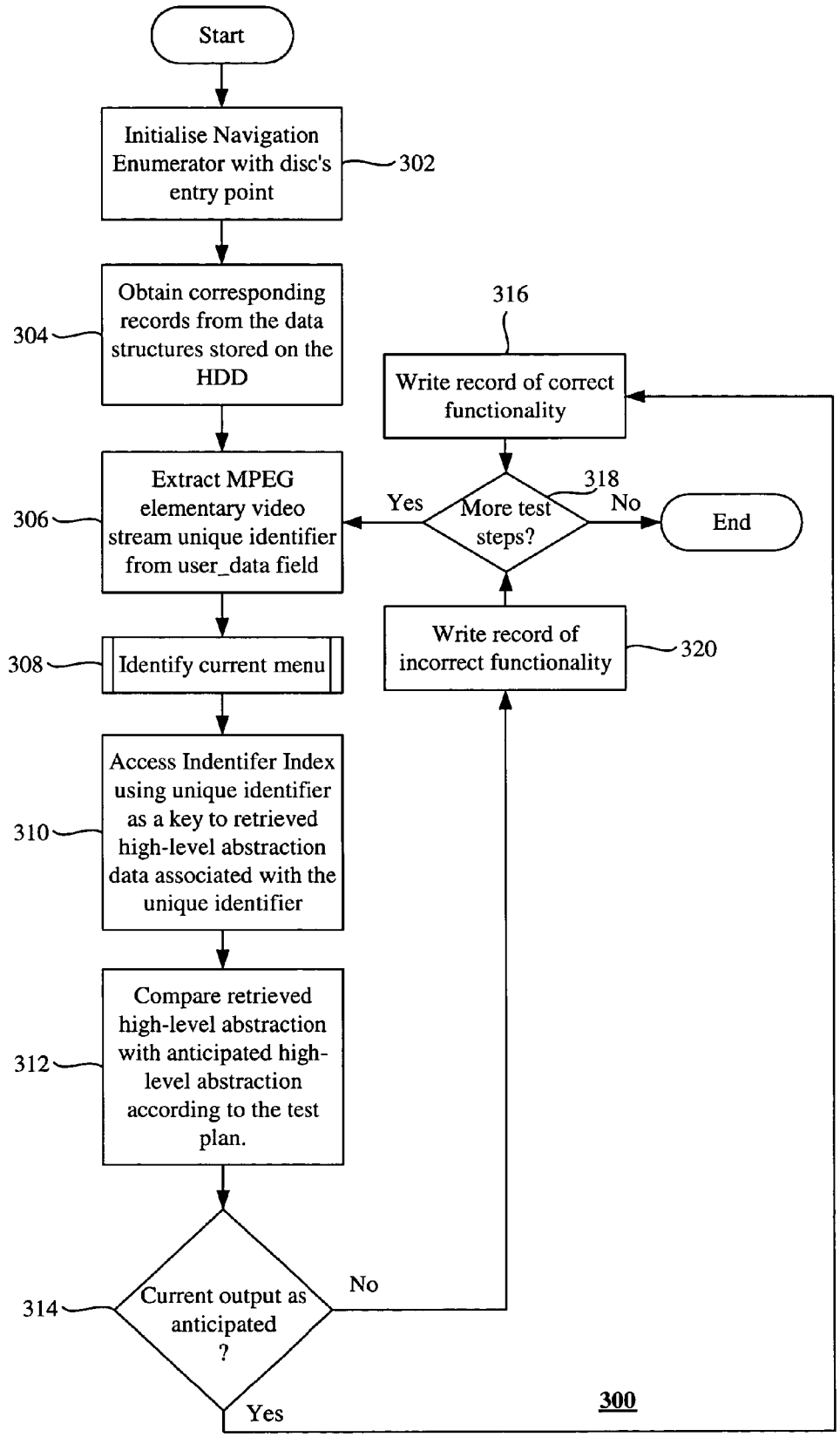
FIG. 3 shows a first aspect of testing a DVD according to an embodiment.

FIG. 3 shows a flowchart 300 for testing the functionality of a DVD according to an embodiment. At step 302, the navigation enumerator is initialised with the disc's entry point or, in the general case, a desired entry point. It will be appreciated that using a desired entry point, rather than a disc's start entry point, has the advantage that functionally separate parts of the disc or content can be tested in isolation. This allows testing to be made more efficient, especially when options are encountered. Rather than testing all content preceding an option for every option at a particular decision point, the start point for the test can be the decision point, with the preceding content having been previously tested or assumed to be functionally correct. The initialisation establishes the point within the high level abstraction of the disc 202 contained within the test plan 240 at which the comparison between the content of the test disc 202 and the anticipated content of that disc is commenced. It will be appreciated that when testing the complete disc, one skilled in the art might usually start from the discs initial entry point. The high-level abstractions stored on the HDD corresponding to the disc's entry point are retrieved by the navigation enumerator 218 at step 304. The unique identifier is read from the user_data field of the MPEG elementary video stream processed by the presentation engine 210 in response to the navigation engine 212 responding to the navigation enumerator's 218 commands to obtain the first, or a current, MPEG elementary video stream.

At step 308, the current menu being processed by the navigation engine 212 is identified. The identifier index is accessed using the extracted unique identifier to identify, within the high-level abstractions stored on the HDD 224, the corresponding abstraction corresponding to that unique identifier. It will be appreciated that the test might call for actuation of a button. Therefore, the navigation enumerator 218 simulates actuation of that button by providing appropriate signalling to the navigation engine.

A comparison is performed, at step 312, between the retrieved high-level abstraction corresponding to the unique identifier and an high-level abstraction anticipated as being encountered next by the test plan. A test is performed, at step 314, to determine whether the currently processed, or output, video data or video signals are as anticipated, that is, it is determined whether or not there is a match between the high-level abstraction of the current assets and the anticipated high-level abstraction according to the test plan 240. If the determination is positive, a record is written to the test results file 234 providing an indication to that effect. A determination is made at step 318 as to whether or not there are further test steps to be performed within a current test. If the determination at step 318 is positive, processing proceeds from step 306 where the next MPEG elementary video stream is processed to extract its corresponding unique identifier. However, if the test at step 318 is negative, testing of the DVD is deemed to be complete and processing terminates. If the test at 314 is negative, a record is written to the DVD functionality test file 234 containing an indication to that effect, where after processing proceeds from step 318. It will be appreciated in practice that the storage of the test results and the tests or test plans will be achieved using the same HDD or the like.

It will be appreciated that the steps of FIG. 3 represent the execution or processing associated with a single test plan. Embodiments can be realised in which a test plan comprising multiple tests is executed. In such embodiments, the processing shown in FIG. 3 will be executed multiple times.

Preferred embodiments of the present invention are realised in the form of a software DVD player that is modified to allow the presentation engine 210 to extract an output the unique identifier contained within the user_data field of the MPEG elementary video stream. Such an embodiment is also modified to allow the navigation engine or navigation manager 212 to output data identifying the current menu to allow the menu extractor 238 to inform the navigation enumerator 218 of the current menu. In preferred embodiments, the menu extractor 238 forms part of the navigation engine 212.

Although the above embodiments use a unique identifier inserted into the user_data field of the MPEG elementary video stream as a reference, embodiments are not limited to such an arrangement. Embodiments can be realised in which, for example, the video stream has some other form of associated unique identifier data. For example, the MPEG elementary video stream might comprise a finger print that can be extracted by the identifier extractor and used as a reference to allow the navigation enumerator to correlate a current position on, or event associated with, the data stored on the disc with the data structures stored on the disc with the data structures stored on the HDD. Alternatively, or additionally, the video represented by the MPEG elementary video stream might comprise "line 21" data. In effect, the "line 21" data comprises a unique identifier associated with each, or selectable, video sequences to be processed during authoring.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A physical storage medium storing a program for testing whether navigational paths through authored digital content comply with a pre-defined test plan, the pre-defined test plan comprising a plurality of abstractions associated with respective raw content objects during authoring of the digital content, and the digital content comprising presentation data capable of being rendered by a presentation engine, the presentation data comprising first presentation data having a position within a navigational path of the digital content, the first presentation data having identification data embedded therein, wherein the program when run on a processor-based system causes the system to:

extract the identification data from the first presentation data in response to the presentation data being rendered;

access, using the identification data, an abstraction, said abstraction being associated with a raw content object from which the presentation data was derived; and determine whether there is a correlation between the accessed abstraction and an anticipated abstraction of a pre-defined test plan, thereby determining whether or not the position of the first presentation data within the navigational path complies with the pre-defined test plan.

2. An automated system for testing whether navigational paths through authored digital content comply with a pre-defined test plan, the pre-defined test plan comprising a plurality of abstractions associated with respective raw content objects during authoring of the digital content, and the digital content comprising presentation data capable of being rendered by a presentation engine, the presentation data having a position within a navigational path of the digital content, and having identification data embedded therein, the system comprising:

means for extracting the identification data from the presentation data in response to the presentation data being rendered, and to access, using the identification data, an abstraction, the abstraction being associated with a raw content object from which the presentation data was derived; and a correlator to determine whether or not there is a correlation between the accessed abstraction and an anticipated abstraction of the pre-defined test plan, thereby determining whether or not the position of the presentation data within the navigational path complies with the pre-defined test plan.

3. An automated system as claimed in claim 2, wherein presentation data comprises a user data field in which the identification data is stored.

4. An automated system as claimed in claim 2, further comprising a navigation controller for controlling access to the presentation data in response to associated navigation data.

5. An automated system as claimed in claim 4 further comprising a register modifier for writing the navigation data to at least one predetermined register accessible by the navigation controller to influence the operation of the navigation controller.

6. An automated method for testing that navigational paths through authored digital content comply with a pre-defined test plan, the pre-defined test plan comprising a plurality of abstractions associated with respective raw content objects during authoring of the digital content, and the digital content comprising presentation data capable of being rendered by a presentation engine, the presentation data including first presentation data having a position within a navigational path of the digital content, and having identification data embedded therein, the method comprising:

extracting the identification data from the presentation data in response to the first presentation data being rendered;

accessing, using the identification data, an abstraction, said abstraction being associated with a raw content object from which the first video sequence was derived; and determining whether or not there is a correlation between the accessed abstraction and an anticipated abstraction of the pre-defined test plan, thereby determining whether or not the position of the first presentation data complies with the pre-defined test plan.

7. A method as claimed in claim 6, further comprising creating a record of the comparison; the record providing an indication of whether the retrieved abstraction matched the anticipated abstraction.

8. A method as claimed in claim 6, wherein extracting comprises extracting the identification data from a user field of the presentation data.

9. A method as claimed in claim 6, further comprising identifying a current menu associated with the data stream.

10. A method as claimed in claim 9 further comprising identifying menu option data, representing at least one option, associated with the current menu and invoking at the at least one option to select and process further presentation data.

11. A method as claimed in claim 6 further comprising creating the test plan.

12. A method as claimed in claim 11 wherein creating the test plan comprises creating at least one of an anticipated unique identifier, an abstraction anticipated as being associated with a unique identifier, an actual abstraction associated with the unique identifier, entry conditions or status information and command information.

13. A method as claimed in claim 11 wherein creating the test plan comprises associating the identification data of the data stream with an anticipated abstraction representing audiovisual content of the data stream.

14. A method as claimed in claim 6 further comprising creating an index comprising an identification data entry for storing a copy of the identification data, and at least a reference to a corresponding abstraction; and accessing the index using the identification data as a key to identify the corresponding abstraction.

\* \* \* \* \*